(12) United States Patent
Piggush

(10) Patent No.: US 8,336,606 B2
(45) Date of Patent: Dec. 25, 2012

(54) INVESTMENT CASTING CORES AND METHODS

(75) Inventor: Justin D. Piggush, Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/224,241

(22) Filed: Sep. 1, 2011

(65) Prior Publication Data

US 2011/0315337 A1 Dec. 29, 2011

Related U.S. Application Data

(63) Continuation of application No. 11/823,699, filed on Jun. 27, 2007.

(51) Int. Cl.
*B22C 9/04* (2006.01)
*B22C 9/10* (2006.01)

(52) U.S. Cl. .......................... 164/516; 164/35; 164/369

(58) Field of Classification Search .................. 164/35, 164/361, 516–519
See application file for complete search history.

(56) References Cited

U.S. PATENT DOCUMENTS

| | | | |
|---|---|---|---|
| 3,214,877 A | 11/1965 | Akin | |
| 4,684,322 A | 8/1987 | Clifford et al. | |
| 4,905,750 A | 3/1990 | Wolf | |
| 5,688,104 A | 11/1997 | Beabout | |
| 6,129,515 A | 10/2000 | Soechting et al. | |
| 6,133,540 A | 10/2000 | Weiss et al. | |
| 6,637,500 B2 | 10/2003 | Shah et al. | |
| 6,929,054 B2 | 8/2005 | Beals et al. | |
| 7,008,186 B2 | 3/2006 | Heeg et al. | |
| 7,237,595 B2 | 7/2007 | Beck et al. | |
| 7,351,036 B2 | 4/2008 | Liang | |
| 2006/0086479 A1 | 4/2006 | Parkos, Jr. et al. | |

FOREIGN PATENT DOCUMENTS

DE 3144958 A1 5/1983
JP 5758947 A 4/1982

OTHER PUBLICATIONS

European Search Report for EP Patent Application No. 08252156.8, dated Sep. 12, 2008.
US Office Action for U.S. Appl. No. 11/823,699, dated Dec. 17, 2008.

*Primary Examiner* — Kuang Lin
(74) *Attorney, Agent, or Firm* — Bachman & LaPointe, P.C.

(57) ABSTRACT

A method involves forming a core assembly. The forming includes deforming a wire, the deforming including increasing a transverse linear dimension along at least one portion of the wire. The wire is assembled to a ceramic core.

24 Claims, 4 Drawing Sheets

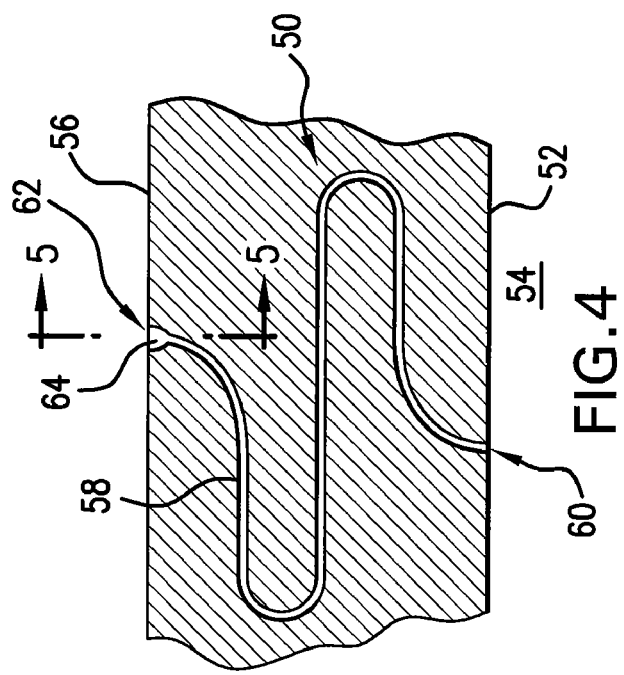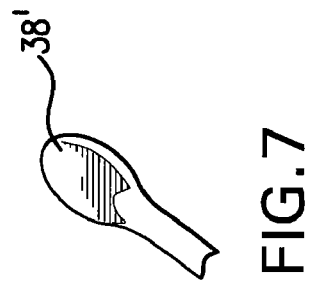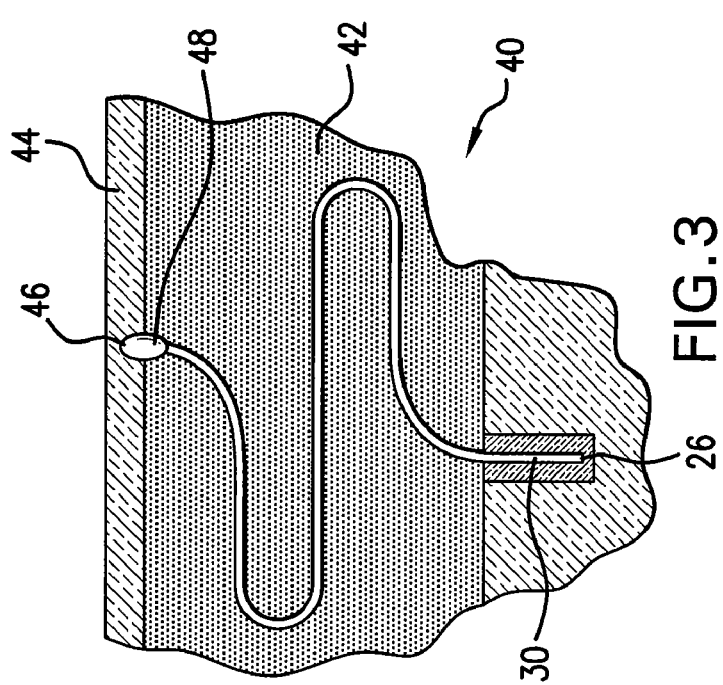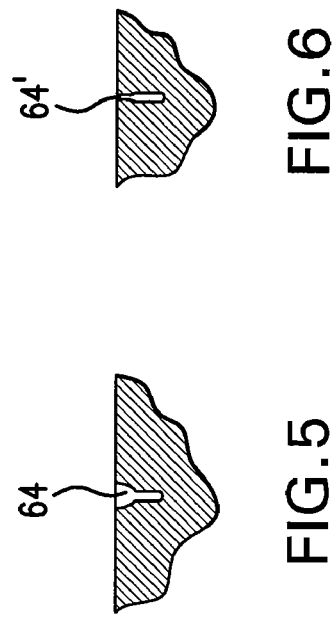

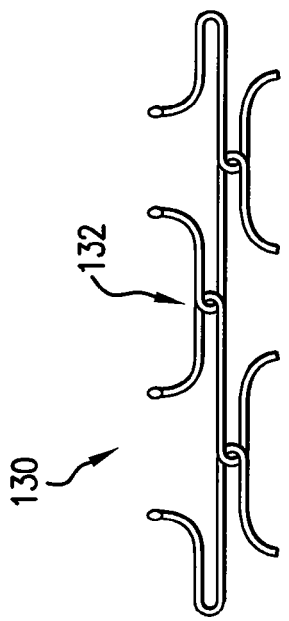
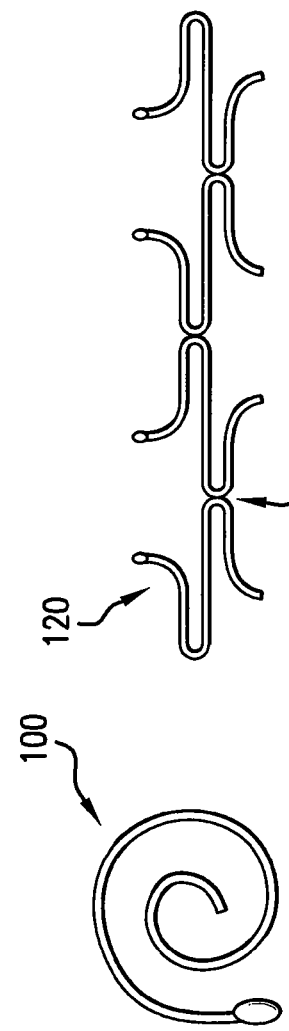
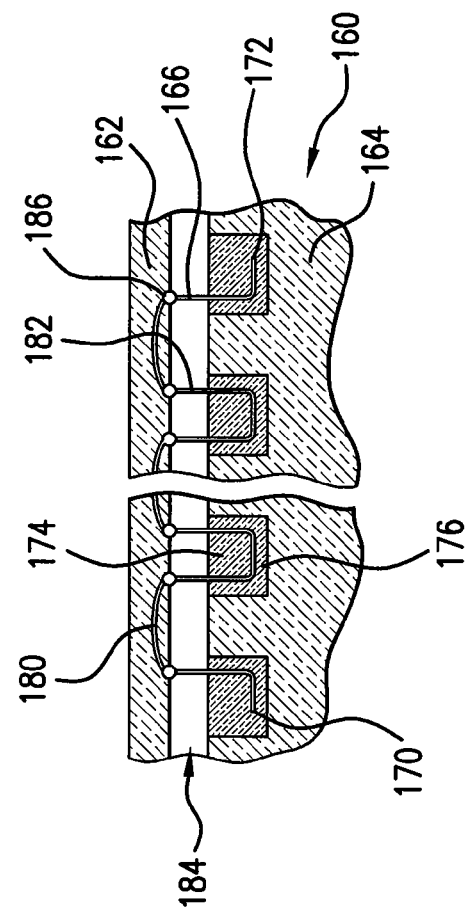
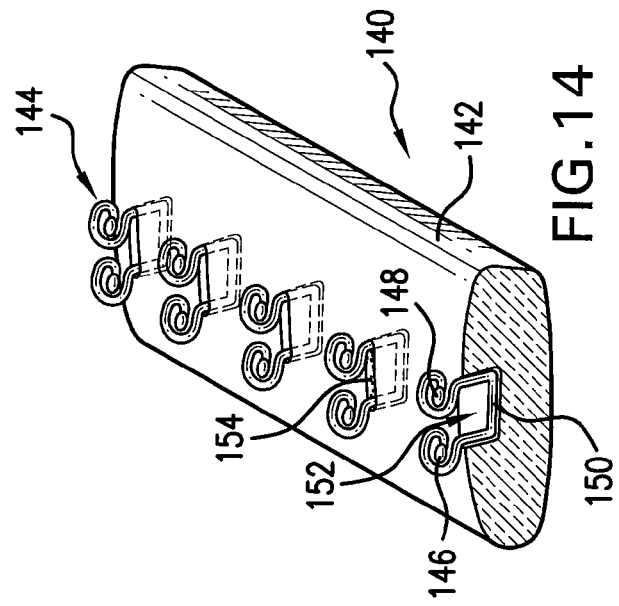

INVESTMENT CASTING CORES AND METHODS

CROSS-REFERENCE TO RELATED APPLICATION

This is a continuation application of Ser. No. 11/823,699, filed Jun. 27, 2007, and entitled "Investment Casting Cores and Methods", now abandoned.

BACKGROUND

The disclosure relates to investment casting. More particularly, it relates to the investment casting of superalloy turbine engine components.

Investment casting is a commonly used technique for forming metallic components having complex geometries, especially hollow components, and is used in the fabrication of superalloy gas turbine engine components.

Gas turbine engines are widely used in aircraft propulsion, electric power generation, and ship propulsion. In gas turbine engine applications, efficiency is a prime objective. Improved gas turbine engine efficiency can be obtained by operating at higher temperatures, however current operating temperatures in the turbine section exceed the melting points of the superalloy materials used in turbine components. Consequently, it is a general practice to provide air cooling. Cooling is provided by flowing relatively cool air from the compressor section of the engine through passages in the turbine components to be cooled. Such cooling comes with an associated cost in engine efficiency. Consequently, there is a strong desire to provide enhanced specific cooling, maximizing the amount of cooling benefit obtained from a given amount of cooling air. This may be obtained by the use of fine, precisely located, cooling passageway sections.

The cooling passageway sections may be cast over casting cores. Ceramic casting cores may be formed by molding a mixture of ceramic powder and binder material by injecting the mixture into hardened steel dies. After removal from the dies, the green cores are thermally post-processed to remove the binder and fired to sinter the ceramic powder together. The trend toward finer cooling features has taxed core manufacturing techniques. The fine features may be difficult to manufacture and/or, once manufactured, may prove fragile. Commonly-assigned U.S. Pat. Nos. 6,637,500 of Shah et al. and 6,929,054 of Beals et al (the disclosures of which are incorporated by reference herein as if set forth at length) disclose use of ceramic and refractory metal core combinations.

SUMMARY

One aspect of the disclosure involves a method wherein a core assembly is formed. The forming includes deforming a wire, the deforming including increasing a transverse linear dimension along at least one portion of the wire. The wire is assembled to a ceramic core.

Another aspect of the disclosure involves a method wherein a core assembly is formed. The forming includes deforming a wire. The wire is assembled to a ceramic core. The assembling includes inserting an intermediate portion of the wire into a compartment of the ceramic core.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 is a view of a shelled pattern including the assembly of FIG. 2.
FIG. 4 is a sectional view of a casting formed from the shelled pattern of FIG. 3.
FIG. 5 is a transverse sectional view of the casting of FIG. 4, taken along line 5-5.
FIG. 6 is a transverse sectional view of an alternate casting.
FIG. 7 is a view of an RMC protuberance associated with the alternate casting of FIG. 6.
FIG. 11 is a view of a second alternate RMC.
FIG. 12 is a view of third alternate RMCs.
FIG. 13 is a view of further alternate RMCs.
FIG. 14 is a view of an alternate core assembly.
FIG. 15 is a sectional view of a shell including an alternate core assembly.

Like reference numbers and designations in the various drawings indicate like elements.

DETAILED DESCRIPTION

Figure 1:
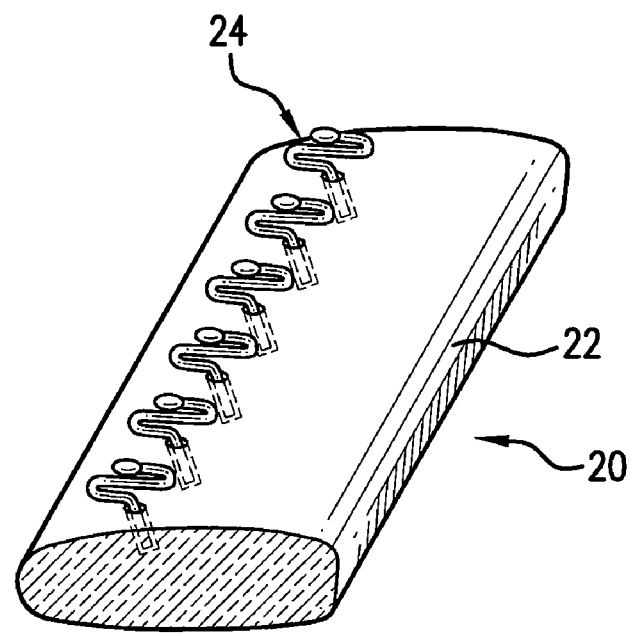
FIG. 1 is a view of a first core assembly.
Figure 2:
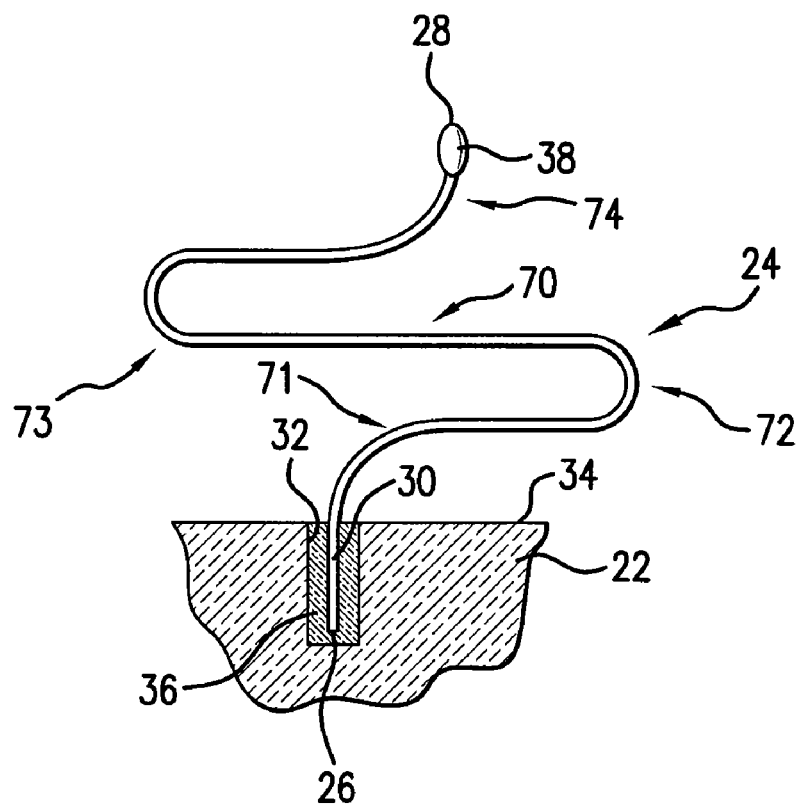
FIG. 2 is a cutaway view of the assembly of FIG. 1.

FIG. 1 shows a core assembly 20 including a molded ceramic feedcore 22 and a plurality of refractory metal cores (RMCs—e.g., molybdenum-based alloys or essentially pure molybdenum) 24. FIG. 2 shows an RMC 24 as extending from a proximal end 26 to a distal end 28. A proximal end region 30 of the RMC is within a compartment 32 of the feedcore 22 with the remaining portion of the RMC protruding beyond an adjacent surface 34 of the feedcore. The portion 30 may be secured in the compartment 32 via a material 36 which may be an adhesive and/or space-filling material (e.g., a ceramic adhesive).

The exemplary RMC 24 has a distal end protuberance 38. A remainder of the RMC may be of essentially uniform cross-section (e.g., a circular section inherited from a wire precursor to the RMC). The RMC may be manufactured in one or more steps by cutting from a larger body (e.g., a roll) of wire, plastically deforming the wire to form the convoluted shape, and forming the protuberance 38.

The protuberance 38 may be formed by a deforming to increase at least one transverse dimension. Exemplary deforming may include one or more of melting and stamping. An exemplary deforming may locally increase cross-sectional area (e.g., a melting might form a globular protuberance of increased dimension in two transverse directions. An exemplary alternative wire cross-section is rectangular or square.

Although an exemplary protuberance is of increased cross-sectional area, other protuberances may have decreased areas (e.g., potentially associated with a flattening/fanning so that the cross-section increases in at least one linear dimension but may decrease in another).

Before or after the forming of the RMC 24, the end portion 30 is inserted into the compartment 32 and, optionally, secured thereto via the material 36. A sacrificial pattern-forming material (e.g., a wax) may be molded at least partially over the feedcore 22 and RMC 24 so as to form a casting pattern. The casting pattern may be shelled. FIG. 3 shows a shelled pattern 40 including the core assembly 20, pattern wax 42, and a ceramic stucco shell 44. A distal portion 46 of the protuberance 38 is embedded within the shell 44 whereas the proximal portion 48 is embedded in the wax 42. An end portion (not shown) of the feedcore 22 may also be embedded in the shell 44. After dewaxing, the core assembly is left within the shell 44, with the RMCs 24 extending within a cavity between the feedcore and shell. Molten metal is then cast in the cavity.

FIG. 4 shows the metal casting 50 after decoring/deshelling. The casting 50 has an internal/interior surface 52 along an internal/interior passageway 54 cast by the surface 34 of the feedcore 22. The casting 50 has an external/exterior surface 56 cast by the shell interior surface. The casting 50 has an outlet passageway 58 cast by the RMC 24. The passageway 58 has an inlet 60 at the surface 52 and an outlet 62 at the surface 56. At the outlet 62, the passageway 58 has a flared discharge end 64 cast by the protuberance proximal portion 48.

FIG. 5 is a section transverse to the exemplary section of FIG. 4 and showing the exemplary discharge end 64 as flared (distally increasing in transverse dimension) in two transverse/normal directions so as to increase in cross-sectional area toward the outlet 62. FIG. 6 is a sectional view similar to FIG. 5 of an alternate discharge end 64' which flares (distally increases in transverse dimension) in one direction but tapers (distally decreases in transverse dimension) in the direction transverse thereto. The outlet may be cast by the correspondingly shaped portion of a protuberance (e.g., the proximal portion of a terminal/end protuberance). For example, such a discharge end may be formed by the proximal portion of a flattened protuberance 38' (FIG. 7) which may be formed by stamping or otherwise compressing.

In an exemplary reengineering situation, the passageway 58 may replace a straight drilled passageway of a baseline configuration. The convolution offered by casting may increase specific heat transfer relative to the baseline. The flaring of the discharge end may serve a similar function as chamfering of drilled outlet passageways. The engineering or reengineering may configure the flaring of the discharge end 64 (and thus of the protuberance 38, 38') to advantageously spread the cooling air film over the surface of the component (e.g., of the casting after any further machining/treatment/coating). In addition to providing better airflow coverage, the diffuse introduction of cooling air may improve attachment of the cooling film to prevent blow-off of air into the gas flow over the component. The cross-sectional area and shape of the outlet 62 may be configured to provide a desired flow rate and velocity of the outlet flow. The RMC protuberance portion 38;38' and associated passageway discharge end 64;64' may be configured to provide a transition from this shape to the cross-section of the remaining portion of the RMC (e.g., a circular-sectioned wire, square-sectioned wire, or the like). An exemplary transition is an approximately linear transition over a length of approximately 2-10 times the characteristic cross-sectional dimension (e.g., diameter) of the undeformed main portion of the RMC. Exemplary diameter (or other characteristic cross-sectional dimension for non-circular wire) is 0.3-1.0 mm. Exemplary flaring increases the cross-sectional dimension to 2-5 times this amount.

An intermediate portion 70 (FIG. 2) of the RMC 24 may be formed with an appropriate convoluted shape (e.g., at bends 71, 72, 73, and 74) to provide increased flow path length for the resulting passageway 58 (e.g., a length more than double the straight line distance between the inlet 60 and the outlet 62 (e.g., 3-5 times)).

Figure 8:
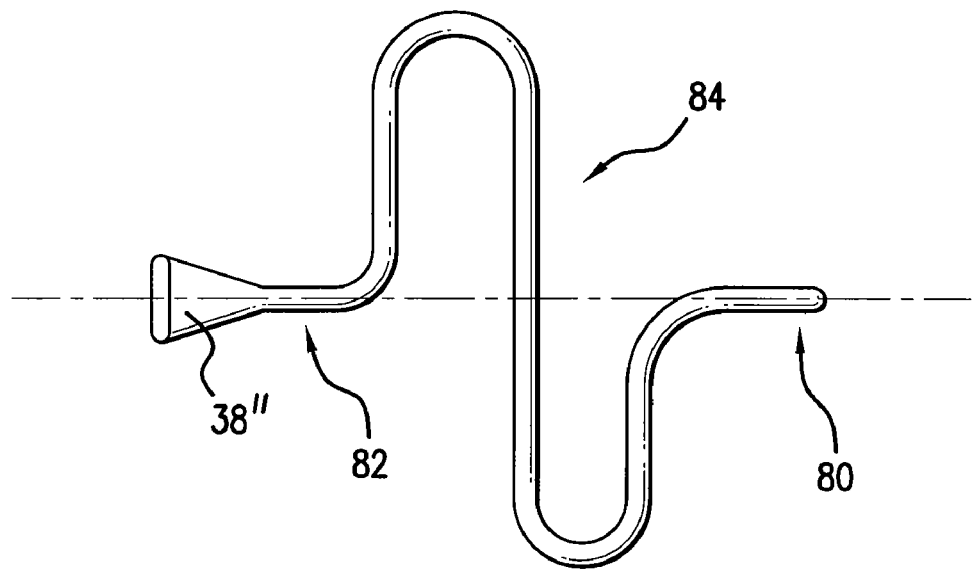
FIG. 8 is a plan view of an alternate RMC.
Figure 9:
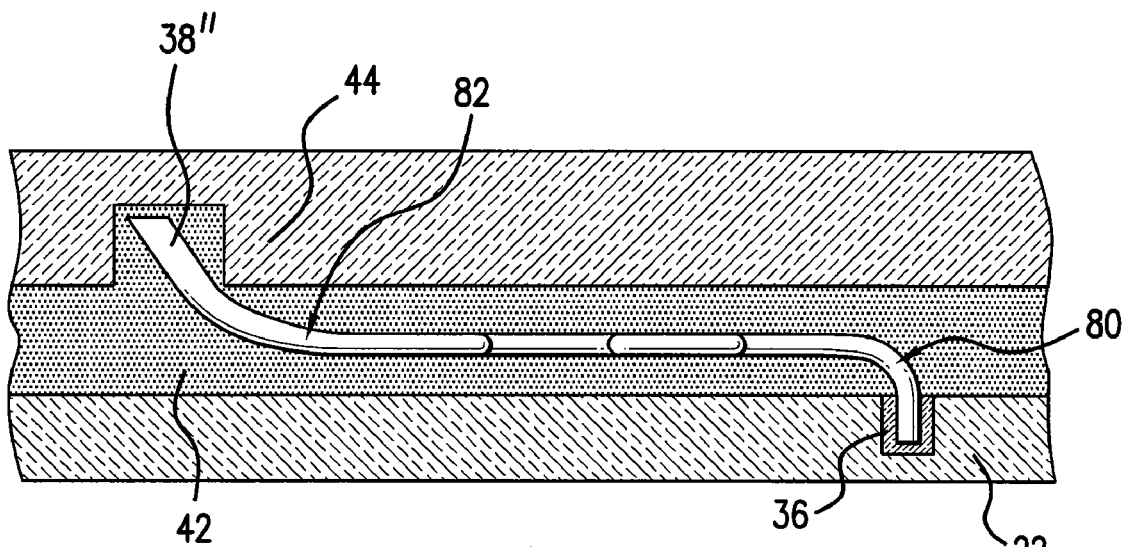
FIG. 9 is a side cutaway view of a shelled pattern including the RMC of FIG. 8.
Figure 10:
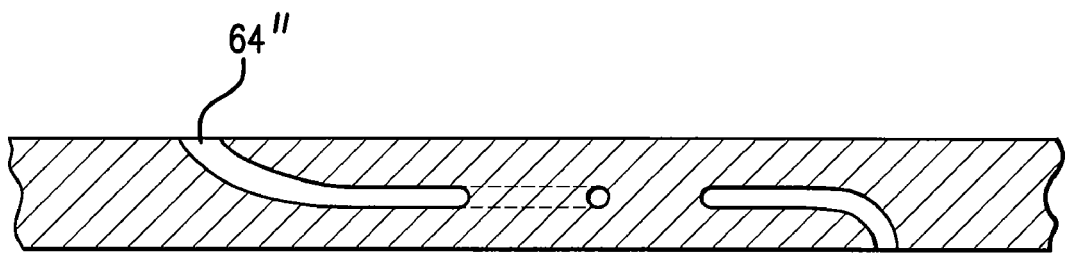
FIG. 10 is a sectional view of a casting formed by the shelled pattern of FIG. 9.

FIG. 8 is a plan view of an alternate RMC with an out-of-plane bend 80 at the proximal portion 30 and an opposite out-of-plane bend 82 inboard of a flattened protuberance 38". The serpentine intermediate portion 84 thus extends lengthwise within the associated pattern material 42 (FIG. 9) to create a corresponding passageway serpentine 86 (FIG. 10) extending lengthwise within the casting. The protuberance 38" casts a corresponding flared discharge end 64".

FIG. 11 shows an alternate RMC 100 wherein the intermediate portion forms a spiral. The spiral configuration may help to manage pressure drop and air flow while providing a desired amount of convective cooling. Outlet passageways are often in locations where there are large pressure differences between the internal feed pressure and the external dump pressure. With a straight drilled hole, hole length is essentially set by wall thickness and drilling angle. A straight hole may result in small frictional losses and a high outlet flow velocity thus causing cooling film blow-off. Serpentine, spiral, or other convoluted configurations may allow tailoring of frictional loss to achieve a desired flow of velocity while providing desired cooling over the planform area occupied by the passageway.

FIG. 12 shows an array of cores 120. Exemplary cores 120 may be secured to each other by joints 122 which may be welds, brazes, and the like. In the case of brazes, these joints may well be effective only to maintain the core array as an assembly during pattern formation and shelling. Casting may well undue the braze.

FIG. 13 shows an alternative array of cores 130 wherein joints 132 are formed by interwrapping, tying, or other mechanical interfitting.

FIG. 14 shows an alternative core assembly 140 including a ceramic feedcore 142 and a plurality of RMCs 144. Each exemplary RMC has first and second ends 146 and 148 each with end protuberances. The RMC has an intermediate portion 150 in a slot-like compartment 152 (optionally secured by filler material 154). The exemplary intermediate portion 150 is a right U-shape and fits securely in the compartment 152.

FIG. 15 shows an alternative core assembly 160 in a shell 162. The core assembly includes a ceramic feedcore 164 and an RMC wire 166. The wire extends from a first end 170 to a second end 172. The wire has a plurality of portions 174 engaged to the feedcore (e.g., embedded in ceramic adhesive or filler 176 in slots 178). The portions 174 are interspersed with portions protruding from the feedcore. Each of the exemplary protruding portions includes a portion 180 embedded in the shell and a pair of leg portions 182 spanning the gap 184 to the adjacent portions 174. Protuberances 186 are formed at junctions of the portions 180 and 182 for casting at least partially divergent outlets in the cast part (e.g., as discussed above). Exemplary protuberances may be formed by mechanical deformation (e.g., crimping). Via such a wire, one or more rows of outlet passageways can be cast from a single wire. Such a wire may be pre-bent and pre-crimped to define the distinct portions and the protuberances. Alternatively, a numerically-controlled machine could make the bends (and optionally the crimps) during placement of the wire.

An exemplary location appropriate for particularly long/convoluted (e.g., serpentine) outlet passageways is on the suction side of a blade or vane airfoil. On the suction side there is typically a large difference between the external (dump) pressure and the internal (feed) pressure. Additionally dumping coolant downstream of the gauge point (the location on the airfoil nearest the adjacent airfoil) results in large aerodynamic losses and is therefore undesirable. The inlet of the serpentine outlet passageway could be downstream of the gauge point. The outlet passageways could then be routed upstream through the wall of the airfoil to an outlet upstream of the gauge point (thereby reducing losses). The lengthening of the passageway caused by convolution could be selected so that the frictional losses within the hole provide an optimal flow rate at an optimal velocity. The pressure loss through the hole roughly translates into heat transfer coefficient. Therefore the convolutions would typically increase the convective efficiency of the hole.

On the pressure side of an airfoil there are local variations in the feed to dump pressure along the airfoil. On the pressure side, the passageway length and degree of convolution may be selected so that the frictional loss within the passageway provide an optimal coolant exit flow rate at an optimal velocity all along the pressure side of the airfoil.

One or more embodiments have been described. Nevertheless, it will be understood that various modifications may be made. For example, the principles may be implemented using modifications of various existing or yet-developed processes, apparatus, or resulting cast article structures (e.g., in a reengineering of a baseline cast article to modify cooling passageway configuration). In any such implementation, details of the baseline process, apparatus, or article may influence details of the particular implementation. Accordingly, other embodiments are within the scope of the following claims.

What is claimed is:

1. A method comprising:
   forming a casting core assembly, the forming including:
      deforming a metallic wire, the deforming including increasing a transverse linear dimension along at least one portion of the wire; and
      assembling the wire to a ceramic core, the assembling comprising inserting an intermediate portion of the wire into a compartment of the ceramic core with first and second portions at opposite ends of the intermediate portion protruding from the compartment.

2. The method of claim 1 wherein the increasing includes:
   increasing a transverse cross-sectional area along said portion.

3. The method of claim 1 wherein the increasing includes:
   decreasing a transverse cross-sectional area along said portion.

4. The method of claim 1 wherein the deforming includes: melting.

5. The method of claim 1 wherein:
   the deforming increases said transverse linear dimension by 2-5 times the undeformed dimension.

6. The method of claim 1 wherein:
   the intermediate portion is a single intermediate portion and the first and second portions respectively comprise first and second ends of the wire left out of the compartment.

7. The method of claim 1 wherein the forming further comprises:
   machining the compartment into the ceramic core.

8. The method of claim 1 wherein the deforming includes: spiraling the wire.

9. The method of claim 1 further comprising:
   molding a pattern-forming material at least partially over the core assembly for forming a pattern;
   shelling the pattern;
   removing the pattern-forming material from the shelled pattern for forming a shell;
   introducing molten alloy to the shell; and
   removing the shell and core assembly.

10. The method of claim 9 used to form a gas turbine engine component.

11. The method of claim 9 used to form a gas turbine engine airfoil wherein the wire casts an outlet passageway.

12. The method of claim 11 wherein:
   the ceramic core casts a feed cavity; and
   the first and second portions of the wire cast respective first and second outlet passageways.

13. The method of claim 1 wherein:
   the intermediate portion is U-shaped.

14. The method of claim 1 wherein:
   the wire has a plurality of said intermediate portions engaged to the ceramic core interspersed with an associated plurality of said first and second portions protruding from the ceramic core.

15. The method of claim 1 further comprising:
   overmolding the core assembly with pattern-forming material and shelling the overmolded core assembly to form a shell so that the first and second portions of the wire protruding from the compartment each have a portion embedded in the shell and a pair of leg portions spanning a gap between the ceramic core and the shell.

16. An investment casting core combination comprising:
   a metallic wire casting core; and
   a ceramic feedcore in which an intermediate portion of the metallic wire casting core is embedded into a compartment of the ceramic feed core with first and second end portions of the metallic wire casting core protruding from the ceramic feedcore.

17. The investment casting core combination of claim 16 further comprising:
   a plurality of additional metallic wire casting cores, each comprising:
      an intermediate portion in a compartment of the ceramic core; and
      first and second end portions protruding from the compartment.

18. An investment casting pattern comprising:
   the investment casting core combination of claim 16; and
   a wax material at least partially encapsulating the metallic wire casting core and the feedcore and having:
      an airfoil contour surface including:
         a leading edge portion; and
         pressure and suction side portions extending from the leading edge portion, first and second end portions of the metallic wire casting core protruding from at least one of the pressure and suction side portions.

19. An investment casting shell comprising:
   the investment casting core combination of claim 16; and
   a ceramic stucco at least partially encapsulating the metallic wire core and the feedcore; and
   an airfoil contour interior surface including:
      a leading edge portion; and
      pressure and suction side portions extending from the leading edge portion and formed by the ceramic stucco.

20. A method comprising:
   forming a core assembly, the forming including:
      deforming a wire; and
      assembling the wire to a ceramic core, including inserting an intermediate portion of the wire into a compartment of the ceramic core and leaving first and second portions of the wire at opposite ends of the intermediate portion out of the compartment.

21. The method of claim 20 wherein the forming further comprises:
   molding the ceramic core.

22. The method of claim 20 wherein the forming further comprises:
   machining the compartment into the ceramic core.

23. The method of claim 20 wherein:
   the intermediate portion is a single intermediate portion and the first and second portions are respective first and second ends of the wire.

24. The method of claim 20 wherein:
   the wire has a plurality of said intermediate portions engaged to the ceramic core interspersed with an associated plurality of said first and second portions protruding from the ceramic core.

* * * * *